C. W. LAURIE.
Stop-Cocks.

No. 143,167. Patented September 23, 1873.

attest.
J. C. Dowell
M. F. Halleck

Inventor.
Charles W. Laurie.
By his atty,
S. L. Denney.

UNITED STATES PATENT OFFICE.

CHARLES W. LAURIE, OF PHILADELPHIA, PENNSYLVANIA.

IMPROVEMENT IN STOP-COCKS.

Specification forming part of Letters Patent No. 143,167, dated September 23, 1873; application filed July 31, 1873.

*To all whom it may concern:*

Be it known that I, CHARLES W. LAURIE, of the city of Philadelphia and State of Pennsylvania, have invented a Straight-Flow Valve, of which the following is a specification:

The object of my invention is to provide a valve which can be used for steam pipes or chambers, and for water or any other liquids, or gases, to pass through in a straight current or flow.

Figure 1:
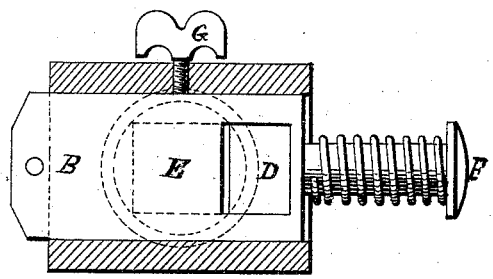
Figure 2:
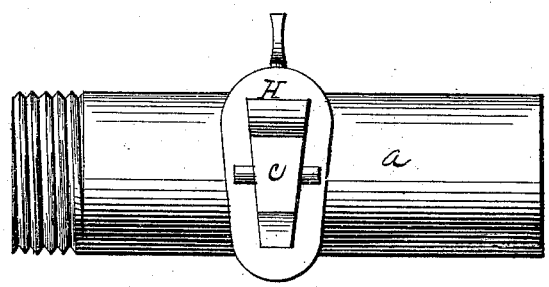

My invention is illustrated in detail in Figure 1, a sectional view through the valve-chambers showing the valve, and Fig. 2 an end view of the valve seat or chamber and its relation to the pipe *a*.

B is a prism-shaped valve viewed in cross-section, which is fitted into the valve-seat C in Fig. 2, it being ground in the seat so as to be steam or water tight. Through valve B the aperture D is formed.

The valve, as shown in its present position, is closed, and by pressing on the thumb-piece F, which is attached to the valve-stem, the aperture D in the valve B is brought opposite to the opening E in the pipe or chamber, and a straight or direct flow of the steam, gas, or liquid is permitted through the valve.

The thumb-screw G is designed to hold the valve fast when either open or closed, as may be desired.

A spring may be placed in a recess formed over the back of the valve at H, which will press against the valve to preserve the ground surfaces in such close contact as to prevent the leaking from a high pressure against the angular surface of the valve presented to such pressure when the valve is closed.

I claim as my invention—

The combination of the prism-shaped valve with the screw G for adjusting it to its seat, as and for the purpose set forth.

CHARLES W. LAURIE.

Witnesses:
 WILLIAM A. PALMER,
 GEO. W. BARBER.